United States Patent

Goshorn et al.

[11] Patent Number: 5,788,438
[45] Date of Patent: Aug. 4, 1998

[54] INFLATABLE COMBINATION CARGO PACKING BAG

[75] Inventors: Douglas A. Goshorn, Lebanon, Ohio; Gregory S. King, Mt. Pleasant, Tenn.; Hugh J. Zentmyer, Green Oaks, Ill.

[73] Assignee: Illinois Tool Works Inc., Glenview, Ill.

[21] Appl. No.: 654,307

[22] Filed: May 28, 1996

[51] Int. Cl.⁶ .................................................... B60P 7/16
[52] U.S. Cl. ........................................... 410/119; 410/125
[58] Field of Search ................................ 410/117, 118, 410/119, 125, 122, 155; 206/522; 428/35.2; 383/25, 109, 113

[56] References Cited

U.S. PATENT DOCUMENTS

| | | | |
|---|---|---|---|
| 3,199,689 | 8/1965 | Feldkamp | 410/119 |
| 3,204,825 | 9/1965 | Underwood | 383/109 X |
| 3,556,318 | 1/1971 | Hollis . | |
| 3,868,026 | 2/1975 | Baxter | 410/119 |
| 3,955,690 | 5/1976 | Baxter | 410/118 |
| 4,040,526 | 8/1977 | Baxter et al. | 410/119 |
| 4,136,788 | 1/1979 | Robbins | 410/119 |
| 4,591,519 | 5/1986 | Liebel | 410/119 X |
| 4,872,558 | 10/1989 | Pharo | 206/522 |
| 5,134,001 | 7/1992 | Osgood | 428/35.2 |
| 5,288,188 | 2/1994 | Vance | 410/119 |

*Primary Examiner*—Stephen T. Gordon
*Attorney, Agent, or Firm*—Schwartz & Weinrieb

[57] ABSTRACT

An inflatable dunnage bag is comprised of a first and independently sealed bag that is inserted within a paper tube before the tube ends are sealed to form a second, independent bag. The combination of an inner bag within an outer bag provides increased bursting strength compared to similar ply bags created as only a single bag. The combination bag is much easier to construct since at least two plies of paper that are pressed to form the inner bag are no longer part of the bag end folding and sealing process. This is especially true if the outer bags ends are sealed by stitching them together.

20 Claims, 4 Drawing Sheets

INFLATABLE COMBINATION CARGO PACKING BAG

BACKGROUND OF THE INVENTION

1. Field of the Invention

The present invention relates to dunnage bags for use in shipment of freight by truck, rail, aircraft, ship, and the like, and more particularly to an inflatable dunnage bag for such use having an increased bursting strength.

2. Description of the Prior Art

Inflatable, disposable dunnage bags are relatively inexpensive and provide a quick method of preventing lading and cargo damage that is caused by shifting and movement from unsecured loads. Inflatable dunnage bags are placed between individual and adjacent cargo pieces, or between cargo pieces and the freight carrier wall panels, in an initially deflated condition, and then are subsequently inflated with compressed air to a predetermined pressure, usually below a bag bladder bursting pressure. Most bags in use today are specially constructed such that they can withstand bursting pressure of 12–30 psig.

Such bags are typically comprised of a sealed plastic bladder such as polyethylene, which is surrounded by a multi-walled paper bag that functions to protect the bladder and increase the bursting strength thereof. A valve extends between the bladder and the outermost layer of the paper bags, such that the bladder and bag assembly can be simultaneously filled and expanded with compressed air from a compressed air source.

Inflatable dunnage bags are typically manufactured by folding a length of multiple-layered kraft paper onto itself at its edges, in order to form a rather long and overlapping seam generally along the bag centerline, thereby forming a multi-walled paper tube that has open ends. The sealed plastic bladder is inserted into the tube and then the paper tube ends are folded-over onto themselves. They are then either glued or sewn closed to form the completed air bag. The tube ends can even be closed by a combination of gluing and sewing.

Thus, it can be appreciated that when making multi-layered bags, the bag construction is ultimately limited by the ability to sew the multiple layers together, as well as being able to effectively fold and glue the layers together without the glued folds unraveling. There is also the associated problem of being able to acceptably cut the multiple layers of paper in one operation. Furthermore, construction of multi-layered air bags is relatively labor intensive, and the greater the number of layers, the greater the labor costs. Thus, a premium is certainly paid in trying to attain an inflatable dunnage bag which has a higher capacity to resist loading and hence, bursting through the addition of extra paper layers.

OBJECT OF THE INVENTION

It is the primary object of the present invention to provide an improved inflatable dunnage bag which has a higher bursting pressure than previously accomplished, and which is more easily manufactured than those heretofore available and which eliminates the necessity for sewing all of the paper layers comprising the paper tube.

SUMMARY OF THE INVENTION

In accordance with the present invention, the inflatable air cargo bag is comprised of a completed two-ply air bag which is then inserted into a 2,4, or 6-ply paper tube that is eventually sealed to form a second bag. This new "combination" bag is still comprised of 4, 6, or 8 plies of paper like those currently available, however, this new combination bag can be assembled faster and in a less costly fashion, and will withstand higher bursting pressures than similar ply bags constructed under the old methodology.

The first or inner two-ply air bag forms an internal cavity which contains a polyethylene bladder and the outside of the bag is pierced with a valve which has been heat sealed to the inner bag and has been pressure tested. The second and outer paper tube that eventually forms the second and outside paper bag contains multiple layers of paper, and the outermost ply can optionally be coated with a thin film of polyethylene. After the two-ply bag is inserted within the second paper tube, the final combination bag is assembled by folding and gluing the remaining tube flaps; no sewing is performed on the outside bag, only the inside one. As an example of the utility of the present invention, a combination 6-ply bag only requires two beads of glue and no stitching as a result of the reduced number of paper plies being folded, and surprisingly, the bag now has an average burst strength of 27 psig.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views thereof, and wherein.

DETAILED DESCRIPTION OF THE PREFERRED EMBODIMENT

Inflatable cargo air bags of the type known, keep the cargo shipped within overseas containers, truck trailers, and railway boxcars, from moving or shifting during transport. Typically, such bags are provided lengthwise between the cargo members so as to compact and push the load toward the container side walls; additional bags are provided to also push the cargo into the container end walls. All such bags cushion the cargo against impacts by absorbing shocks, and it can be appreciated that cargo bags provide a simple and effective solution for protecting the lading. However, as lading capacities increase, the ability of a dunnage bag to resist bursting must also be increased. The inflatable dunnage bag of the present invention is able to meet all of the desired requirements and satisfy the shortfalls of previous bags by providing a unique "bag within a bag" arrangement.

or what is described herein, a "combination" bag that allows the bag to withstand greater bursting pressures.

Figure 1:
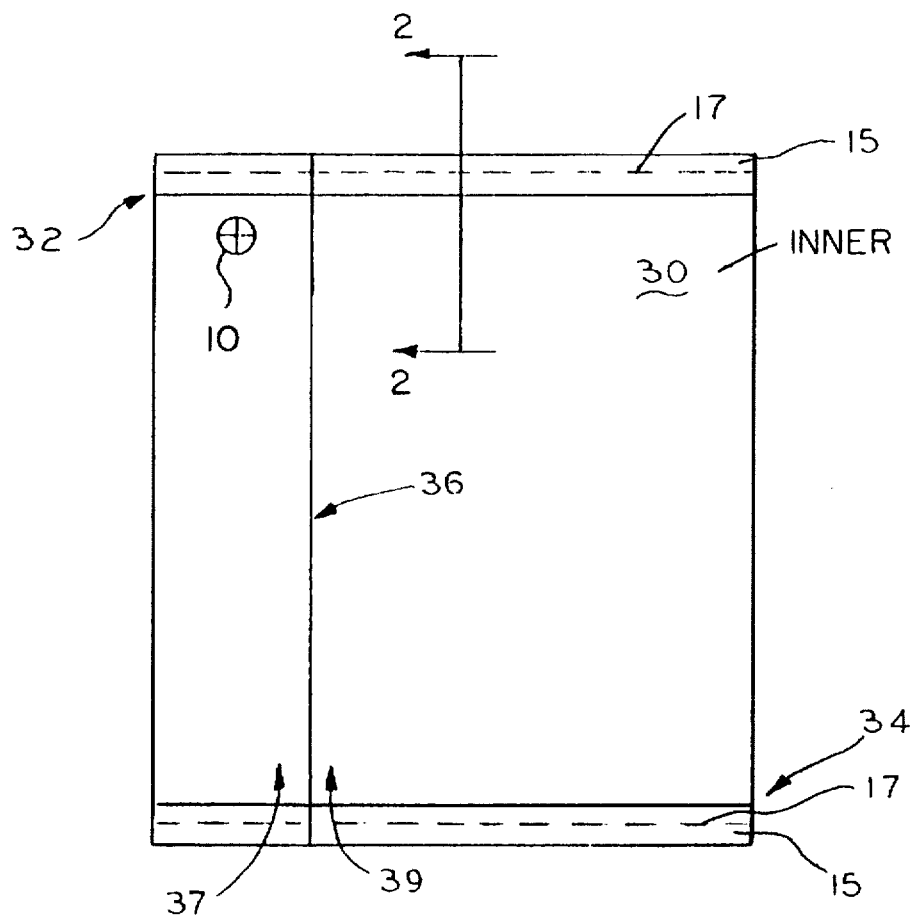
FIG. 1 is a plan view of the inside, two-ply dunnage bag which is incorporated into the combination bag of the present invention.
Figure 2:
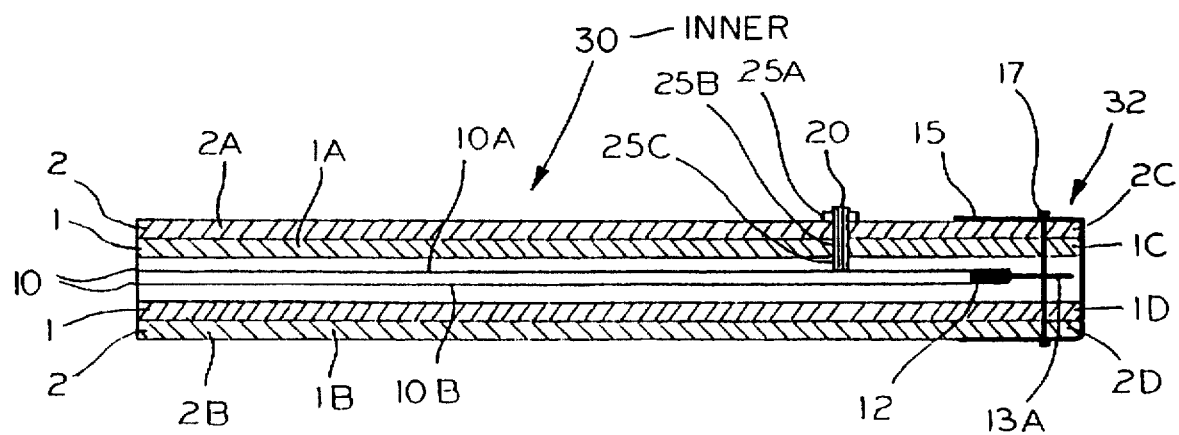
FIG. 2 is a cross-sectional view of the two-ply bag of FIG. 1, taken along line 2—2.

Turning attention to FIG. 1, there is shown the general construction of the inner and first bag 30 used in the present invention. Incidentally, it will be appreciated that the finished combination air bag will also have the same general configuration as the inner bag 30, although the ends of the combination bag will be sealed differently from that of the inner bag 30. As will be understood from the below description, the inner and outer bag which collectively form the combination bag, will each have the same generally rectangular configuration. As seen in FIG. 2, the inner bag 30 is comprised of a first end 32 and a second end 34, which are each enclosed by a binding material 15, before the ends and binding are sewn together so as to close or seal the ends. The longitudinal or lengthwise seam illustrated at 36 in FIG. 1 is formed by gluing the overlapped long sides 37, 39 of the bag 30 and it can be appreciated that once the long sides and the ends are sealed, the inner bag 30 defines a bag interior 30A. An inflation valve 20 is provided for inflating interior 30A of the inner bag 30 with a compressed gas, which is preferably air. As will become clearer later, valve 20 will also upwardly extend through the multiple paper layers of the later-added paper tube, although the air will only be contained within the bladder of the inside bag 30.

FIG. 2 shows in greater detail the internal construction of inner bag 30 when the ends are sewn together. Inner bag 30 is comprised of two plies of extensible kraft paper that receive a thermoplastic bladder 10. Each ply is superposed upon the other and has a like rectangular configuration. In actual construction, bladder 10 will initially be supplied in the form of a continuous polyethylene tube that only requires heat sealing of its two ends, for it does not include a long center seam. FIG. 2 only shows one end of bag 30, although it should be clear that the other bag end will be constructed exactly the same.

As seen in cross-section, the thermoplastic bladder 10 is comprised of a first wall 10A and a second wall 10B that are heat sealed at the plastic tube end to form a sealed joint 12. The joint 12 is formed intentionally wide so as to form a flap 13A. The flap provides a flat area on the bladder 10 which can be held stationary within the paper tube, and hence, within the first paper bag 30 when the stitching 17 penetrates and simultaneously joins the bladder 10 to the binding 15 and paper walls 1 and 2. A second bladder flap, not shown, would similarly be formed on the opposite bladder end and attached the same way. Construction of the first and inner bag 30 is comprised of laying the first paper ply 1 on top of the second paper ply 2 and then folding the plys in half so that the plies 1 and 2 respectively form upper plies 1A,2A and lower plies 1B,2B wherein each ply has a respective first end 1C, 2C corresponding with a respective second end 1D, 2D, thereby interposing bladder 10 therebetween. A means for closing and sealing each end of the inner bag is then applied. FIG. 2 shows one embodiment for sealing the inner bag, where a binding 15 encloses the ends of bladder 10 and the plies 1 and 2, before a stitching 17 of twine threading penetrates and seals the first end 32 by drawing the bladder flap 13A, the binding 15, and the paper plies 1 and 2 together. It is preferable to provide at least 32 stitches for every 10 inches of bag end length. The second end 34 of bag 30 is closed and sealed in a similar fashion. It should be realized that end 34 in this disclosure is preferably formed from the midpoint of each ply 1, 2 being folded in half, onto itself, and then sewn together, with the other flap of the bladder 10. Instead of folding the paper plies 1, 2 in half, it is also possible to form each paper ply 1, 2 as four separate and discrete paper walls that are later sealed together at each end so that no folding is required.

As mentioned earlier, inner bag 30 includes an inflation valve 20, which extends through respective holes 25a, 25b, and 25c, that are cut into top wall 2A, 1A and 10A respectively of paper ply 2, 1, and the polyethylene bladder 10. Valve 20 is heat sealed to top wall 10A of bladder 10 and pressure tested prior to insertion within the paper tube plies 1 and 2; this ensures the integrity of the inner bag 30 before fully assembling it into the combination bag. Although not shown, the valve 20 can include a snap-on handle or a combination handle and closing cap for facilitating filling bag 30 and sealing valve 20. It should be appreciated that bag 30 has an average burst strength of about 9.0 psig, and although it may be used for very light-duty applications, it is the intention of this invention to insert bag 30 into an open second paper tube comprised of either 2, 4, 6, or 8 plys of paper, before the second paper tube is closed. In this way, the combination bag will be comprised of a concentric arrangement of a first bag 30 containing the bladder 10, within a second bag of multiple paper layers. This combined bag will have a much higher bursting strength against impacts than conventionally constructed bags.

Figure 4:
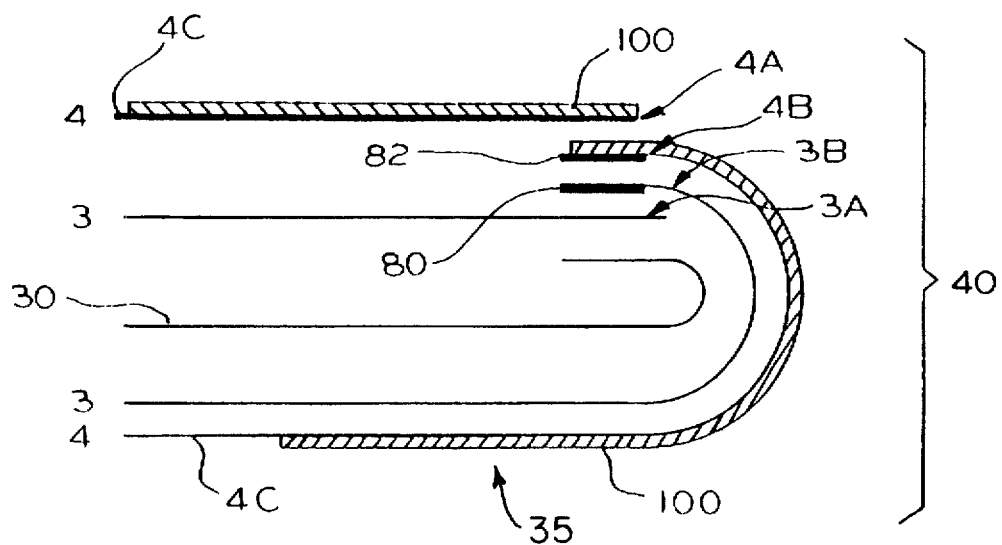
FIG. 4 is a fragmented cross-sectional view of a 4-ply bag of the present invention.

FIG. 4 shows a 4-ply combination bag of the present invention, and it is to be understood that the opposite end which is not shown, will be constructed in an exact manner as described below.

Figure 3:
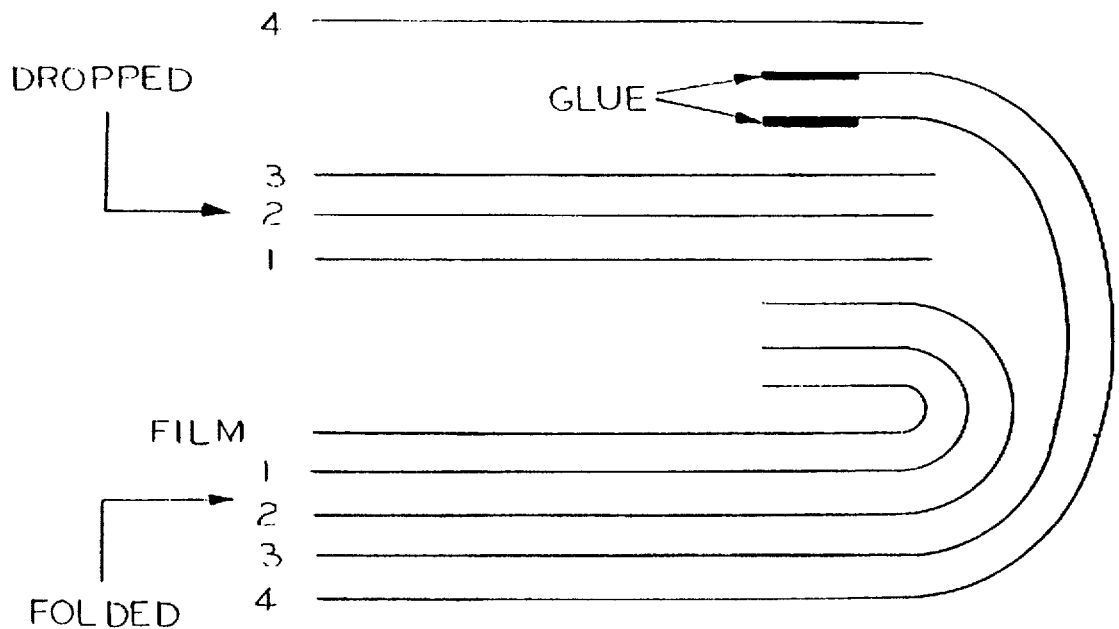
FIG. 3 is a fragmented cross-sectional view of a prior art 4-ply bag.

It is seen that inner and first bag 30 is inserted between two additional paper plies, herein identified as reference characters 3 and 4, thereby providing a total of two paper plys from the inner bag 30, and then two plies from the second paper tube. Here it is seen that plies 3 and 4 have respective first and second ends 3A, 4A and 3B, 4B. The ends 3A, 4A are dropped ends, with ends 3B, 4B being folded and interconnected to ends 3A, 4A by glue beads 80, 82, placed as shown, in order to seal the ends of the second paper tube and form the second and outer bag 40. The outside surface 4C of paper ply 4 (upper and lower walls) can be coated with a polyethylene plastic 100 so as to provide protection to the entire outside surface of the combination bag, and this plastic coating 100 is melded together through well-known heat sealing techniques at the point where ply end 4A is superimposed on top of the outside surface 4C of ply end 4B. This polyethylene coating 100 can be similarly provided on all of the other embodiments disclosed here, although it is not shown as such in the drawing figures. As seen by comparing FIG. 4 with that of the prior art 4-ply bag shown in FIG. 3, the present 4-ply bag is easier to construct since there are fewer paper plies to simultaneously cut, fold, and glue together at one time since inner bag 30 is a separately formed bag. Although this particular embodiment requires the same number of glue beads as the prior art bag, the advantage of having fewer folded edges which tend to unfold themselves after folding, along with the advantage of having all of the ends being sealed with glue, creates a much stronger bag than prior 4-ply bags. The bursting strength of the present 4-ply bag is 17 psig versus 15 psig of the prior art bag.

Figure 5:
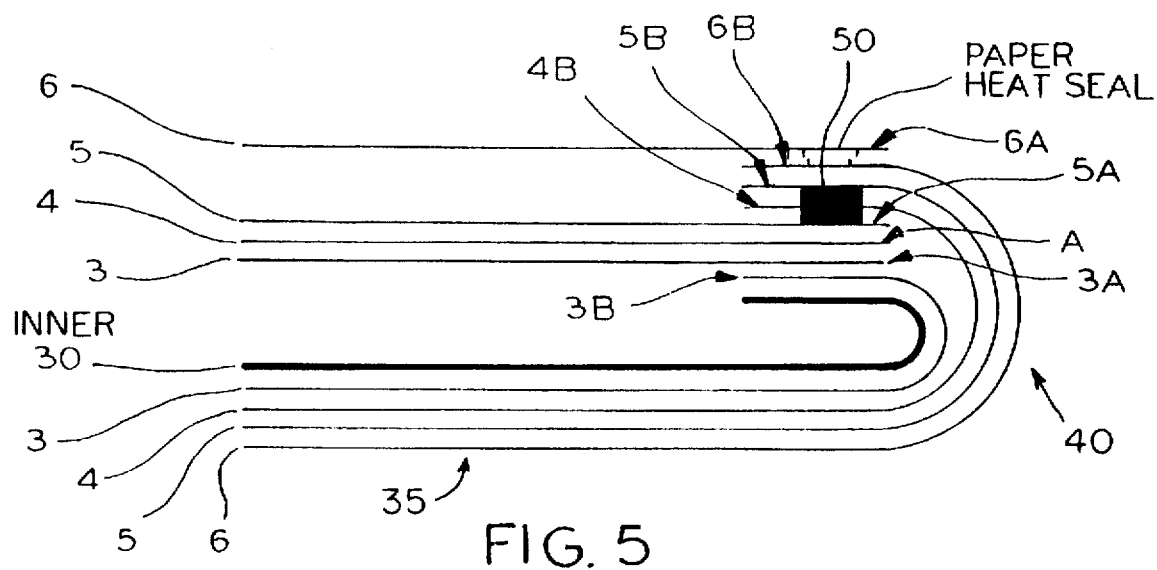
FIG. 5 is a fragmented cross-sectional view of a 6-ply bag of the present invention.
Figure 6:
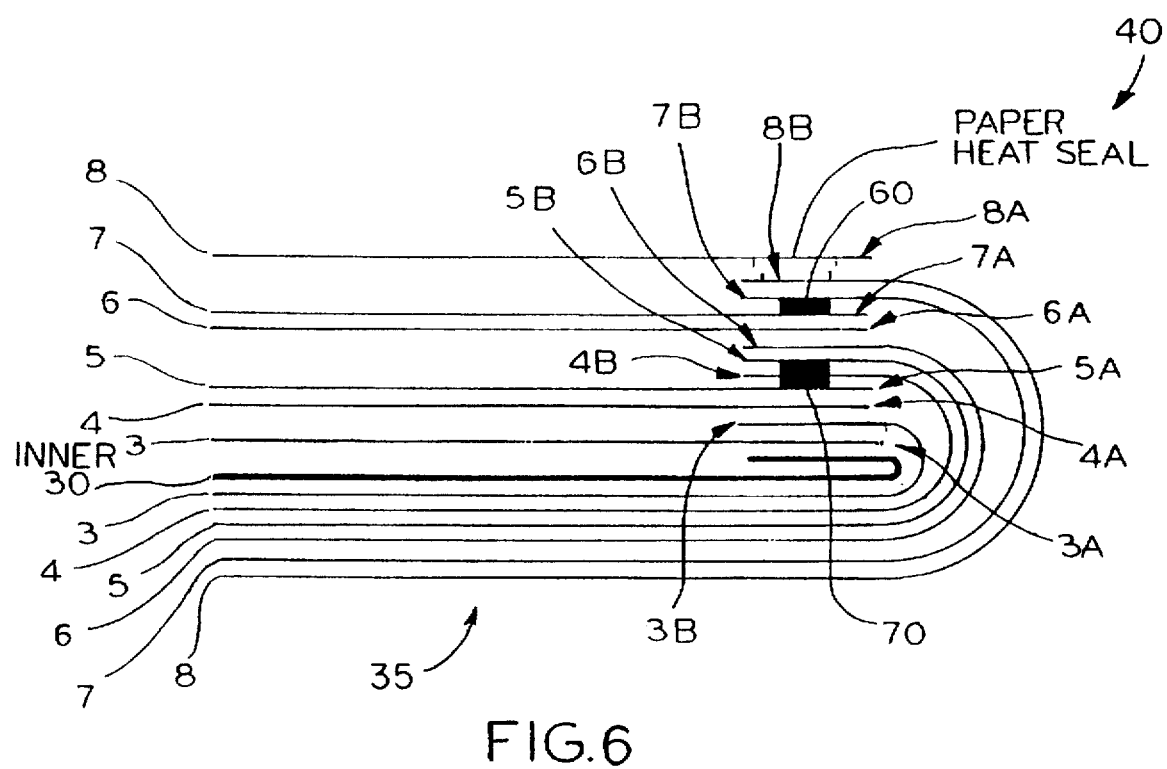
FIG. 6 is a fragmented cross-sectional view of an 8-ply bag of the present invention.

Turning attention now to FIGS. 5 and 6, partial sectional views of 6-ply and 8-ply combination bags of the present invention will now be described in greater detail. It should also be clear from viewing these figures, that the opposite end of the bag which is not shown, will be constructed exactly in the same manner as the end which will be described.

Figure 7:
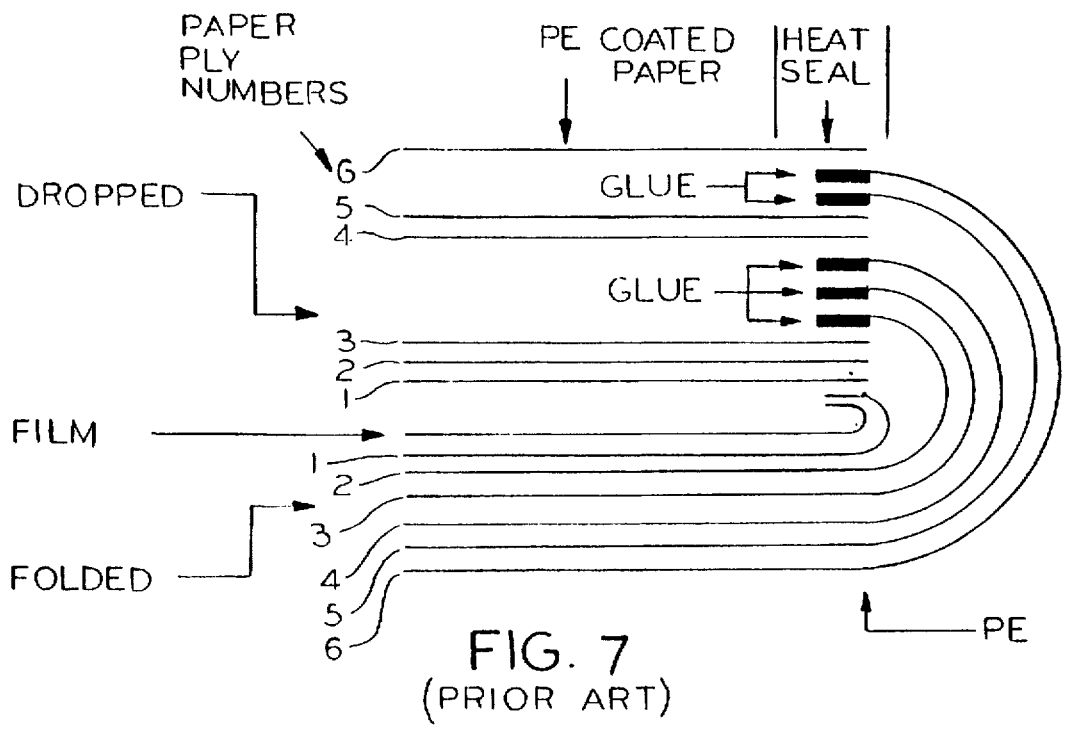
FIG. 7 is a fragmented cross-sectional view of a prior art 6-ply bag.

FIG. 5 illustrates that inner bag 30 is comprised of two paper layers folded around a plastic bladder, as previously described, with bag 30 being surrounded by four additional paper plies, herein identified as reference characters 3, 4, 5, and 6. Thus, it should be appreciated that this embodiment has an equivalent total of 6 plies, two of which are independent from the other four plies, as they are provided through the construction of inner bag 30, with the four additional plies forming outer bag 40 when plies 3–6 are sealed. Here it is seen that plies 3–6 have respective first and second ends 3A–6A and 3B–6B, which are uniquely folded, glued, and heat-sealed so as to reduce the number of folded ply ends and the number of glue beads needed to secure the ends, as compared to a conventional 6-ply bag, shown in FIG. 7. With the six-ply bag of the present invention, it is seen that ends 6A and 6B are heat-sealed together, while ends 4B, 5B and 5A are glued together by the single glue bead 50. The end 3B is folded back on top of itself and between bag 30 and end 3A. The end 4A floats free between ends 3A and 5A. As FIG. 7 shows, all six paper layers of the prior art bag are folded back upon each other as a collective group before the five beads of glue and heat-sealing are used to seal the bag end. As mentioned before, the more paper layers there are, the more burdensome it becomes to fold the ends and the harder it is for the glue to bind and prevent the inherent tendency of a folded end to unfold itself. Furthermore, burst tests of the bag of FIG. 7 have found such bag to have an average burst strength of 24.0 psig. The 6-ply bag of the present invention on the other hand was found to have an average burst strength of at least 27 psig, but less than 30 psig.

Figure 8:
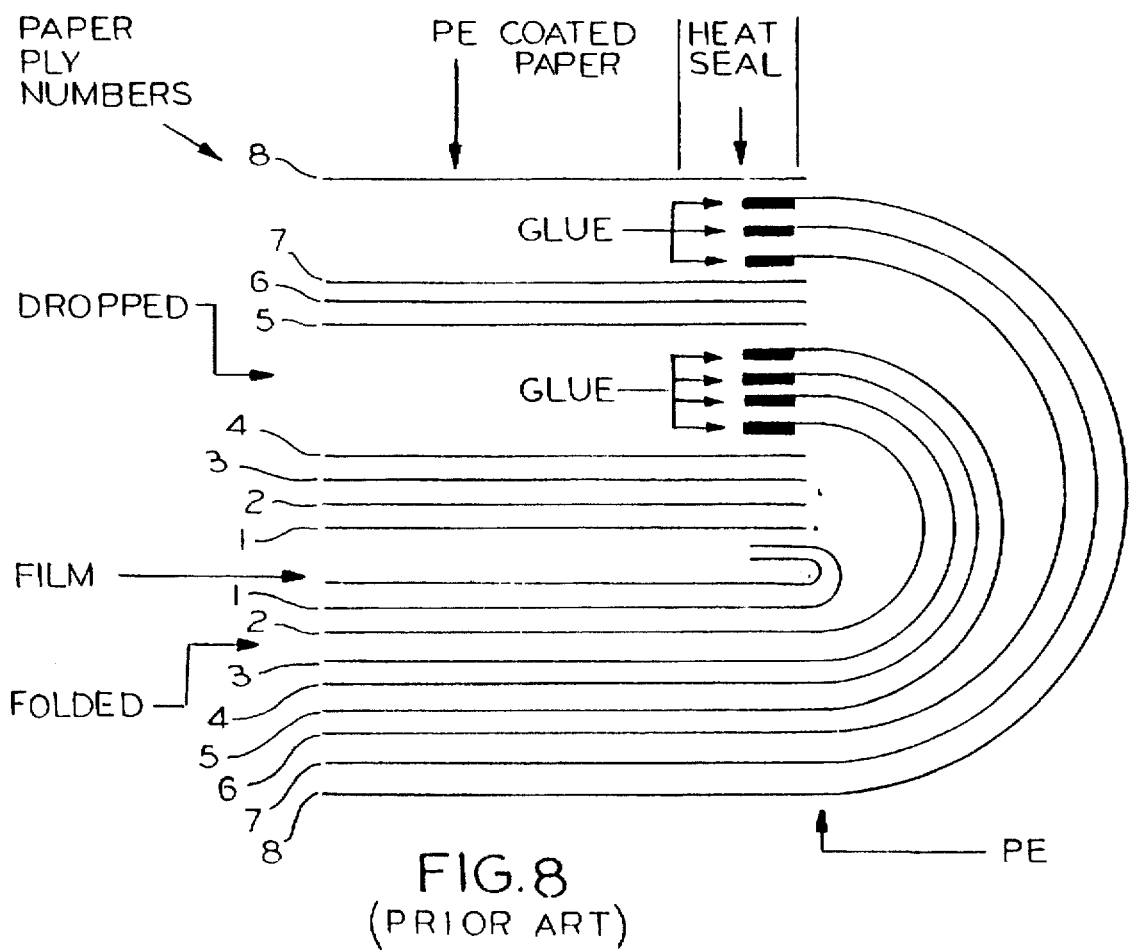
FIG. 8 is a fragmented cross-sectional view of a prior art 8-ply bag.

The third bag presented by the present invention is shown in FIG. 6. This embodiment has an equivalent total of 8 paper plies, two of which are independent from the other six plies, as they are provided through the construction of inner bag 30. There, it is seen that plies 3–8 also have respective first and second ends 3A–8A and 3B–8B, which are uniquely folded, glued and heat-sealed so as to reduce the number of ply ends needing to be heat-sealed and the number of glue beads needed to secure all the ends, as compared to the conventional 8-ply bag shown in FIG. 8. FIG. 8 illustrates that with a prior art bag, seven beads of glue are necessary to secure the sixteen ends. With the 8-ply bag of the present invention, only two beads of glue are required, such that ends 7A and 7B are sealed together by glue bead 60, as are ends 5B, 4B and 5A by glue bead 70. The ends 8B and 8A are also heat-sealed together, while ends 6A, 6B, and 4A, 3A, and 3B float free. It should also be noted that the inner bag 30 is inserted between all the provided paper layers and has each end 32, or 34 folded over onto itself before the tube ends are sealed and glued to form the outer bag 40; this is true for either of the embodiments shown in FIGS. 5 and 6. Field tests of the bag shown in FIG. 6 were found to have an average burst strength of at least 34 psig, while the prior art bag of FIG. 8 was found to have an average burst strength of about 30 psig.

Besides the inherent advantages of increased burst strengths, the bag of the present invention also provides manufacturing benefits because of the reduced number of ends to be folded and glued, mainly since two plies are initially formed together when making the inner bag. In conjunction with that advantage, there is also the elimination of film pulling and end-sealing since the inner bag is heat-sealed and closed independently from the second bag and its paper tube ends which are heat-sealed and glued. Furthermore, the present bladder is outwardly protected by two plies of paper, thereby eliminating insertion nicks that typically destroy the integrity of the bladder when it is conventionally inserted within the paper tube standing alone. Since prior art bags are not pressure tested for bladder integrity until every component is sealed together, bag testing is simpler, since the inner bag can be independently tested before it is inserted into the paper tube, thereby drastically reducing the occurrence of bladder failures and the requirements for bag testing of bulky, heavyweight bags.

While the invention has been described in conjunction with specific embodiments thereof, it is evident that variations will be apparent to those skilled in the art in light of the above description. Accordingly, it is intended that all such variations be included within the spirit and scope of the appended claims.

We claim:

1. An inflatable dunnage bag, comprising:

a sealed outer bag which defines a first interior space therein;

an inflatable bladder having a first wall, a second wall, and an interior space defined between said first and second walls;

a sealed inner bag disposed within said first interior space of said sealed outer bag and defining a second interior space therein within which said inflatable bladder is disposed, said sealed inner bag having a predetermined length defined between opposite first and second ends thereof and comprising at least two paper plies wherein at least one of said at least two paper plies is disposed upon an exterior surface of each one of said first and second walls of said inflatable bladder, said at least two paper plies have substantially the same lengths extending from said first end of said sealed inner bag to said second end of said sealed inner bag such that end portions of said at least two paper plies have end edges disposed within a common plane which is disposed transverse to said lengths of said at least two paper plies, and wherein further, said sealed inner bag, comprising said at least two paper plies and said inflatable bladder disposed between said at least two paper plies, is sealed separately and independently from said sealed outer bag; and means for inflating said inflatable bladder of said sealed inner bag with air, said means being sealingly secured to said inflatable bladder and in fluidic communication with said interior space of said inflatable bladder.

2. The dunnage bag of claim 1, wherein:

said outer bag is comprised of at least two paper plies.

3. The dunnage bag as set forth in claim 2, wherein:

opposite ends of said inflatable bladder comprise flaps; and said opposite end flaps of said inflatable bladder and opposite ends of said at least two paper plies of said inner bag are stitched together so as to seal said inner bag.

4. The dunnage bag as set forth in claim 2, wherein:

said outer bag comprises six paper plies.

5. The dunnage bag as set forth in claim 2, wherein:

said outer bag comprises four paper plies.

6. The dunnage bag of claim 2, wherein:

said at least two paper plies of said outer bag each has a first end and a second end; and one end of said outer bag is formed with said at least two paper plies of said outer bag being folded over onto themselves and said second ends of said at least two paper plies of said outer bag being inserted between said first ends of said at least two paper plies of said outer bag.

7. The dunnage bag of claim 6, wherein:

said at least two paper plies of said outer bag comprise first and second paper plies; and outside surface portions of said second paper ply of said outer bag are coated with a film of polyethylene.

8. The dunnage bag of claim 1, wherein:

said at least two paper plies of said sealed inner bag are superimposed with respect to each other, are of substantially like configuration, and said at least two paper plies of said sealed inner bag form respective top and bottom walls of said sealed inner bag, a first end, a second end, a left side edge, and a right side edge, said left and right side edges being overlapped and glued along a lengthwise seam thereby forming a paper tube.

9. The dunnage bag as set forth in claim 1, wherein:

said inflatable bladder comprises a thermoplastic material.

10. The dunnage bag as set forth in claim 9, wherein:

said thermoplastic material comprises polyethylene.

11. An inflatable dunnage bag comprising:

an outer bag having a closed first end, a closed second end, and defining a first sealed interior space therein;

an inner bag disposed within said first interior space of said outer bag, said inner bag comprising first and second paper plies wherein said plies are superimposed and are of substantially like configuration, and wherein said inner bag comprising said paper plies has a first end, second end, left side edge, and right side edge, wherein said left and right side edges are overlapped and glued so as to form a long seam, each of said first and second ends of said inner bag including a means for closing said first and second ends thereby forming a second sealed interior space within said inner bag which is separate and independent from said first sealed interior space of said outer bag;

a thermoplastic bladder disposed within said second interior space of said inner bag, said bladder having sealed first and second ends respectively defined by first and second joints, said sealed bladder ends defining a bladder cavity for receiving a compressed gas therein, each of said sealed ends forming a respective first and second flap, and each of said flaps being respectively sewn to said first and second ends of said inner bag; and an inflation valve inserted into said dunnage bag for communicating said compressed gas into said bladder cavity for inflation of said dunnage bag.

12. The dunnage bag as set forth in claim 11, wherein:

said outer bag comprises at least two paper plies.

13. The dunnage bag of claim 12, wherein:

said at least two paper plies of said outer bag each has a first end and a second end; and said closed first end of said outer bag is formed with said at least two paper plies of said outer bag being folded over onto themselves and said second ends of said at least two paper plies of said outer bag being inserted between said first ends of said at least two paper plies of said outer bag.

14. The dunnage bag of claim 13, wherein:

said at least two paper plies of said outer bag comprise first and second paper plies; and outer surface portions of said second paper ply of said outer bag are coated with a film of polyethylene.

15. The dunnage bag as set forth in claim 12, wherein:

said outer bag, comprising at least two paper plies, comprises four paper plies.

16. The dunnage bag as set forth in claim 12, wherein:

said outer bag, comprising at least two paper plies, comprises six paper plies.

17. The dunnage bag of claim 11, wherein:

said outer bag is comprised of four paper plies comprising first, second, third, and fourth paper plies, wherein each one of said four paper plies has a first end and a second end;

said first end of said fourth paper ply is heat-sealed to said second end of said fourth paper ply;

said second end of said third and second paper plies are glued to each other and to said first end of said third paper ply; and said second end of said first paper ply is folded over said first end of said inner bag and below said first end of said first paper ply.

18. The dunnage bag of claim 11, wherein:

said outer bag is comprised of six paper plies comprising first, second, third, fourth, fifth, and sixth paper plies, wherein each one of said six paper plies has a first end and a second end;

said first end of said sixth paper ply is heat-sealed to said second end of said sixth paper ply;

said second end of said fifth paper ply is glued to said first end of said fifth paper ply;

said second ends of said second and third paper plies are glued together and to said first end of said third paper ply;

said second end of said first paper ply is inserted between said first ends of said first and second paper plies; and said first end of said fourth paper ply is inserted between said first end of said fifth paper ply and said second end of said fourth paper ply.

19. The dunnage bag as set forth in claim 11, wherein:

opposite ends of said inflatable bladder comprise flaps; and said opposite end flaps of said inflatable bladder and opposite ends of said first and second paper plies of said inner bag are stitched together so as to seal said inner bag.

20. The dunnage bag as set forth in claim 11, wherein:

said inflatable bladder comprises a thermoplastic material.

* * * * *